US007320023B2

(12) United States Patent
Chintalapati et al.

(10) Patent No.: US 7,320,023 B2
(45) Date of Patent: Jan. 15, 2008

(54) MECHANISM FOR CACHING DYNAMICALLY GENERATED CONTENT

(75) Inventors: Murthy Chintalapati, Santa Clara, CA (US); Pallab Bhattacharya, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 691 days.

(21) Appl. No.: 09/792,811

(22) Filed: Feb. 23, 2001

(65) Prior Publication Data

US 2002/0120710 A1    Aug. 29, 2002

(51) Int. Cl.
*G06F 13/00* (2006.01)
(52) U.S. Cl. ...................... 709/216; 709/203
(58) Field of Classification Search ............... 709/206, 709/203, 216–219; 707/10, 1
See application file for complete search history.

(56) References Cited

U.S. PATENT DOCUMENTS

| | | | | |
|---|---|---|---|---|
| 5,918,013 A | * | 6/1999 | Mighdoll et al. | 709/217 |
| 6,185,608 B1 | * | 2/2001 | Hon et al. | 709/216 |
| 6,205,481 B1 | * | 3/2001 | Heddaya et al. | 709/226 |
| 6,289,358 B1 | * | 9/2001 | Mattis et al. | 707/203 |
| 6,330,561 B1 | * | 12/2001 | Cohen et al. | 707/10 |
| 6,564,218 B1 | * | 5/2003 | Roth | 707/10 |
| 6,584,548 B1 | * | 6/2003 | Bourne et al. | 711/134 |
| 6,751,608 B1 | * | 6/2004 | Cohen et al. | 707/3 |
| 6,792,507 B2 | * | 9/2004 | Chiou et al. | 711/119 |
| 6,877,025 B2 | * | 4/2005 | Copeland et al. | 709/203 |
| 7,096,418 B1 | * | 8/2006 | Singhal et al. | 715/501.1 |
| 7,228,318 B2 | * | 6/2007 | Li et al. | 707/203 |
| 2002/0099768 A1 | * | 7/2002 | Wright et al. | 709/203 |
| 2002/0116474 A1 | * | 8/2002 | Copeland et al. | 709/219 |
| 2003/0061272 A1 | * | 3/2003 | Krishnamurthy et al. | 709/203 |
| 2003/0187917 A1 | * | 10/2003 | Cohen | 709/203 |

OTHER PUBLICATIONS

"13 Objects, Images, and Applets," pp. 1-21, http://www.w3.org/TR/1998/REC-html40-19980424/struct/objects.html, downloaded Jun. 13, 2001.

(Continued)

*Primary Examiner*—Kenneth R. Coulter
(74) *Attorney, Agent, or Firm*—Bobby K. Truong; Hickman Palermo Truong & Becker LLP

(57) ABSTRACT

A mechanism for caching dynamically generated content is disclosed, wherein initially, a server receives a request from a client for a set of dynamically generated content. In response to the request, the server accesses a cached version of the requested content, which was generated previously, and determines whether the cached version is still valid. If the cached version is no longer valid (e.g. is out of date), then the requested content is dynamically generated and stored in a cache, replacing the outdated version. In addition, the freshly generated content is provided to the client in response to the request. The client is thus provided with the most current information. On the other hand, if the cached version is still valid, then the server foregoes generating the content. Instead, it provides the cached version of the content to the client. By doing so, the server reduces the time required to return the content to the client, and significantly improves system performance.

34 Claims, 4 Drawing Sheets

OTHER PUBLICATIONS

"16 Frames," pp. 1-13, http://www.w3.org/TR/1998/REC-html40-19980424/present/frames.html, downloaded Jun. 13, 2001.

"Chapter 7, Reverse Proxy," pp. 1-8, http://developer.netscape.com/docs/manuals/proxy/adminux/revpxy.html, downloaded Jun. 13, 2001.

Addison Ching, "Internet Access Control Using Proxy Servers," California Educational Data Processing, *The DataBus*, vol. 36, No. 1, Dec. 1995-Jan. 1996, pp. 1-2, http://www.cedpa-k12.org/databus-issues/v36n1/proxy.html, downloaded Jun. 13, 2001.

"Caching Proxy Servers," 11 pages, http://www.rad.com/networks/1998/proxy/title.htm, downloaded Jun. 13, 2001.

"Caching 101," pp. 108, http://www.caching.com/caching101.htm, downloaded Jun. 13, 2001.

"Server Caching," pp. 1-3, http://www.caucho.com/articles/caching.xtp, downloaded Jun. 20, 2001.

"Squid Web Proxy Cache," 1 page, http://www.squid-cache.org downloaded Jun. 20, 2001.

\* cited by examiner

MECHANISM FOR CACHING DYNAMICALLY GENERATED CONTENT

FIELD OF THE INVENTION

This invention relates generally to computer systems, and more particularly to a mechanism for caching dynamically generated content to improve system efficiency.

BACKGROUND

Many of today's web servers dynamically generate content in response to client requests. For example, in response to a request for a current stock price, a web server may: (1) consult a database to ascertain the current price of the stock; (2) dynamically construct a response page incorporating the current stock price; and (3) send the response page to the client for rendering thereby. Typically, to generate content dynamically, a web server invokes an application, such as a common gateway interface (CGI) program or a server side plug-in. In response, the application performs most if not all of the operations required to generate the dynamic content. Then, once the content is generated, it is provided either to the client or to the web server, which in turn sends it to the client. In this manner, a dynamically generated set of information is returned to the client in response to its request.

One of the primary advantages of generating content dynamically is that it enables the server to provide the most up to date information in response to the client request. Unlike serving up static pages, which may contain stale information, generating content dynamically enables a server to ensure that the information provided to the client is current. This is important in many implementations, such as the stock quote implementation noted above. The main disadvantage of generating content dynamically is that it is much more resource intensive than serving up static pages, and hence, is typically much slower. As noted above, dynamic content is usually generated by invoking an application. This application requires time and resources to execute. Not only that, the application itself often invokes or accesses backend services, such as databases, directory servers, and the like, to obtain needed information. Accessing these services (which often requires resource intensive connections) adds to the slow response time of the server.

This poor performance is exacerbated when the server is required to service a large number of requests at a time. In many of today's servers, it is not unusual for the server to concurrently process thousands of requests. At this high request rate, if the server were to dynamically generate content in response to each request, the performance of the server would most likely degrade dramatically. As this discussion shows, dynamically generating content in response to each request is not scalable. To improve system performance in the face of high request rates, an improved mechanism for managing dynamically generated content is needed.

SUMMARY OF THE INVENTION

In view of the shortcomings discussed above, the present invention provides an improved mechanism for managing dynamically generated content. The present invention is based, at least partially, upon the observation that in many implementations, much of the content that is generated dynamically does not change with each and every request. Rather, the content changes relatively infrequently (e.g. once an hour or once a week). Since the content does not change with every request, it is possible to cache the content and to reuse it in responding to future requests. By reusing cached content, it is possible to avoid generating the content each and every time. By reducing the number of times a set of content is dynamically generated, the performance of the server is significantly improved.

According to one embodiment, dynamically generated content is managed as follows. Initially, a server receives a request from a client for a set of dynamically generated content. In response to the request, the server accesses a cached version of the requested content, which was generated previously, and determines whether the cached version is still valid. If the cached version is no longer valid (e.g. is out of date), then the requested content is dynamically generated and stored in a cache, replacing the outdated version. In addition, the freshly generated content is provided to the client in response to the request. The client is thus provided with the most current information. On the other hand, if the cached version is still valid, then the server foregoes generating the content. Instead, it provides the cached version of the content to the client. By doing so, the server reduces the time required to return the content to the client, and significantly improves system performance.

DETAILED DESCRIPTION OF EMBODIMENT(S)

Functional Overview

Figure 1:
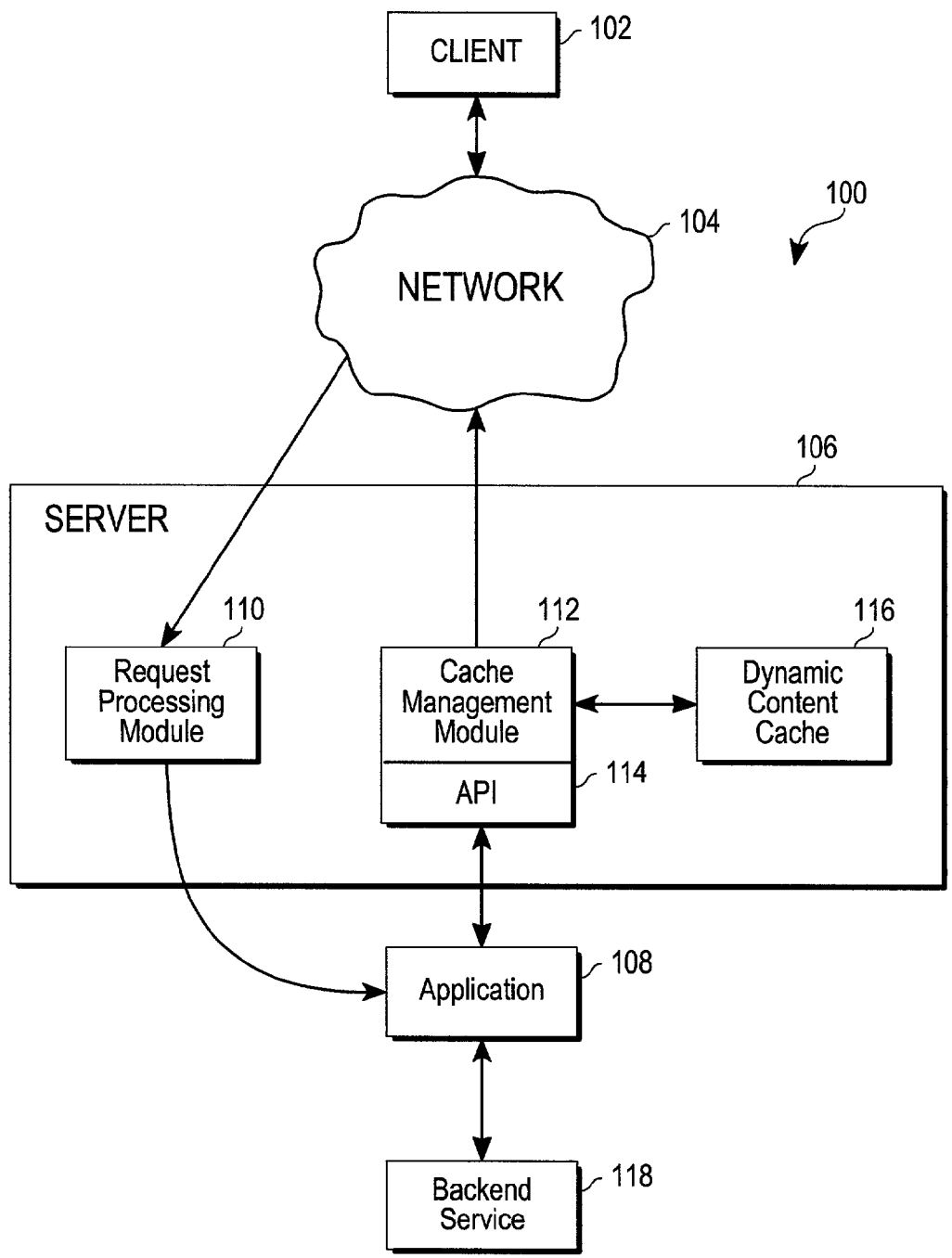
FIG. 1 is a functional block diagram of a system 100 in which one embodiment of the present invention may be implemented.

With reference to FIG. 1, there is shown a functional block diagram of a system 100 in which one embodiment of the present invention may be implemented, the system comprising a client 102, a network 104, a web server 106, and an application 108. For the sake of simplicity, only one client 102 and one application 108 is shown. However, it should be noted that the server 106 is capable of interacting with multiple clients 102 and multiple applications 108. For purposes of illustration, the invention will be described below with reference to a web server 106. It should be noted, though, that the invention is not so limited. Rather, the invention may be implemented in any type of server or computer system in which content is dynamically generated and served.

In system 100, the client 102 may be any mechanism capable of communicating with the server 106, including but not limited to a computer running a browser program. The client 102 may communicate with the server 106 using any known protocol, including but not limited to HTTP and RTSP (real-time streaming protocol), and the client 102 communicates with the server 106 via the network 104. The network 104 may be any type of network, including but not limited to a local area network and a wide area network such as the Internet. The network 104 may even be as simple as a direct connection. Any mechanism capable of facilitating communication between the client 102 and the server 106 may serve as the network 104.

In communicating with the client 102, the server 106 generally receives one of two basic types of requests from the client 102. The first type of request is one where a set of static information is requested. This static information may reside, for example, in a static file or page stored in a storage (not shown). In response to this type of request, the request processing module 110 of the server 106 retrieves the static information from the storage and provides it to the client. Responding to this type of request requires relatively little time and resources.

A second type of request that the request processing module 110 may receive is one where a set of dynamically generated content is requested. Used in this context, the term dynamically generated content (also referred to herein as dynamic content) refers broadly to any information that is provided in response to a request that may change from request to request (e.g. a best sellers books list). Dynamic content may include but is not limited to data, text, graphics, audio/video information, and html (hypertext markup language) pages. In response to this type of request, the request processing module 110 determines which application 108 is to be invoked to satisfy the request. Once the proper application 108 is determined, the request processing module 110 forwards the request to the application 108 for processing. Thereafter, it is the responsibility of the application 108 to dynamically generate the content.

In system 100, application 108 may take on one of many different forms. For example, application 108 may be a server-side plug-in which attaches to the server 106 and runs in the server's memory space. Alternatively, application 108 may be a CGI program, which may be invoked by the server 106, and run in a separate memory space. Whatever form the application 108 takes, it is responsible for generating dynamic content in accordance with a set of logic which is determined by the developer of the application 108. In processing a request for dynamic content, the application 108 may access one or more backend services 118. These backend services 118 may include, for example, a database server, a directory server, a news service, etc. Usually, the backend service 118 provides the application 108 with the information that it needs to dynamically generate the requested content.

A point to note with regard to dynamic content is that even though it may change from request to request, it does not necessarily change with each and every request. For example, a top ten movies list may be generated dynamically, but this list does not change with every request. Rather, it may change only on a daily or a weekly basis. If multiple requests are received for this list during a period in which the list has not changed, then the same list will be dynamically generated over and over again. This redundant generation of the list is a waste of processing resources. With dynamic content that does not change constantly, instead of generating the content every time, it is possible to cache and to reuse the dynamic content to respond to future requests. By doing so, the need to constantly generate dynamic content is reduced, which in turn helps to improve system efficiency. As will be explained further below, this aspect of dynamic content is exploited by the present invention to achieve improved server performance.

In a typical server system, when the application 108 receives a request for dynamic content, it automatically generates the dynamic content in accordance with a set of predetermined logic, and provides the dynamically generated content to the request processing module 110. In turn, the request processing module 110 sends the dynamic content to the client 102 as a response to the client's 102 request. In system 100, however, some dynamic content may already be cached in the dynamic content cache 116, and hence, does not need to be newly generated. With that being a possibility, the application 108 does not automatically generate content in response to a request. Instead, it interacts with the cache management module 112 of the server 106 to coordinate the possible use and refresh of the contents of the dynamic content cache 116. The cooperation between the application 108 and the cache management module 112 will now be described in greater detail.

Cache Management API

To facilitate interaction between the application 108 and the cache management module 112, there is provided, in one embodiment, a cache management API (application programming interface) 114. This API 114 provides a general interface that all applications 108 can use to take advantage of the cache management capability of the server 106. In one embodiment, the API 114 comprises methods/functions that the application 108 can invoke to implement caching of dynamic content. In one embodiment, these methods include an init_cache method and a transmit_cached_response method.

Basically, the init_cache method is invoked by the application 108 to cause the cache management module 112 to initialize a cache set in the dynamic content cache 116 to get it ready for subsequent use by the application 108. In one embodiment, the init_cache method is invoked once for each cache set, and each application 108 may initialize zero, one, or multiple cache sets. Once a cache set is initialized, it can be used by the application 108 and the cache management module 112 to cache dynamic content. This cached dynamic content may thereafter be selectively used in responding to client requests. In one embodiment, the init_cache method is invoked by the application 108 upon system startup. More specifically, during startup of the server 106, an instance of the application 108 is constructed and the constructor of the application 108 invokes the init_cache method.

When the init_cache method is invoked, several sets of information are exchanged between the application 108 and the cache management module 112, with some information flowing from the application 108 to the cache management module 112, and some information returned by the cache management module 112 to the application 108. In one embodiment, when the application 108 invokes the init_cache method, it provides: (1) a Maxentries parameter which specifies the maximum number of entries (i.e. sets of dynamic content) that will be cached in the cache set; (2) a Maxage parameter which specifies the maximum time period during which each entry in the cache set remains valid; (3) a reference to a Refresh callback function; (4) a reference to a Free callback function; and (5) a reference to a Key Compare callback function. The callback functions, which will be described in greater detail in a later section, are provided by the application 108, and are invoked by the cache management module 112 to manage the dynamic content stored in the dynamic content cache 116.

In response to invocation of the init_cache method, the cache management module 112 creates a cache set in the dynamic content cache 116 and returns a handle to the cache set back to the application 108. This handle serves as a reference to the cache set, which the application 108 can use in the future to reference and to access the cache set. In addition, the cache management module 112 associates the parameters (e.g. Maxentries, Maxage, references to callback functions) passed by the application 108 with the cache set, and stores the parameters away for future use. The cache set is thus initialized.

As noted above, the API 114 further includes a transmit_cached_response method. In one embodiment, this method is invoked by the application 108 to send a set of cached dynamic content to a client 102. Put another way, the application 108 invokes the transmit_cached_response method to cause the cache management module 112 to access a particular entry in a particular cache set, and to send the contents of that entry to the client 102 in response to a request. When the application 108 invokes the transmit_cached_response method, the application 108 provides several sets of information to the cache management module 112 as parameters. In one embodiment, this information includes a handle and a key. The handle is the handle to a particular cache set that was previously returned by the cache management module 112 to the application 108 in response to the init_cache method invocation, and the key is a reference to a particular entry within that cache set. Together, this information enables the cache management module 112 to access a specific entry in the dynamic content cache 116. In addition, the application 108 may further provide additional information or content that is to be included with the cached content, such as a header and/or a trailer. If no information is to be added to the cached content, then this may be left null.

In response to the transmit_cached_response method invocation, the cache management module 112 constructs a response. In doing so, the cache management module 112 accesses the cache entry in the dynamic content cache 116 specified by the handle and the key, and extracts the dynamic content stored therein. This process of accessing the contents of the cache entry may involve the invocation of one or more of the callback functions provided by the application 108 in its init_cache method invocation. For example, if the cache management module 112 determines that the content in the accessed cache entry is no longer valid, it may invoke the Refresh callback function of the application 108 to refresh the contents of that cache entry. This may also involve the invocation of the Free callback function. The interaction between the cache management module 112 and the application 108 will be described more fully in a later section, but suffice it to say at this point that in accessing the specified cache entry, the cache management module 112 may invoke one or more of the callback functions of the application 108.

Once the dynamic content is accessed from the specified cache entry, the cache management module 112 merges the additional information (if any) provided by the application 108 in its transmit_cached-response call with the dynamic content to form a response. Thereafter, the cache management module 112 sends the response to the client 102. A response to the client's request for a set of dynamic content is thus provided.

As noted previously, as part of the transmit_cached_response method invocation, the application 108 may pass along additional information, such as a header and/or a trailer, to be merged with the cached dynamic content. A point to note regarding this additional information is that, if so desired, it may be freshly generated by the application 108 in response to each and every request. For example, the additional information may be a different advertisement or a banner that the application 108 freshly generates for each request. Since this additional information is merged with the cached dynamic content to form the response, and since the cached dynamic content is content that does not change with every request, this means that the response may comprise both dynamic content that changes with each and every request, and dynamic content that changes infrequently. This ability to implement caching of infrequently changing dynamic content alongside constantly changing dynamic content is quite advantageous because many if not most commercial web pages have both types of dynamic content on them. By being able to accommodate both types of dynamic content in the same response, the transmit_cached_response method of the API 114 is quite general in its applicability.

Dynamic Content Cache

Figure 2:
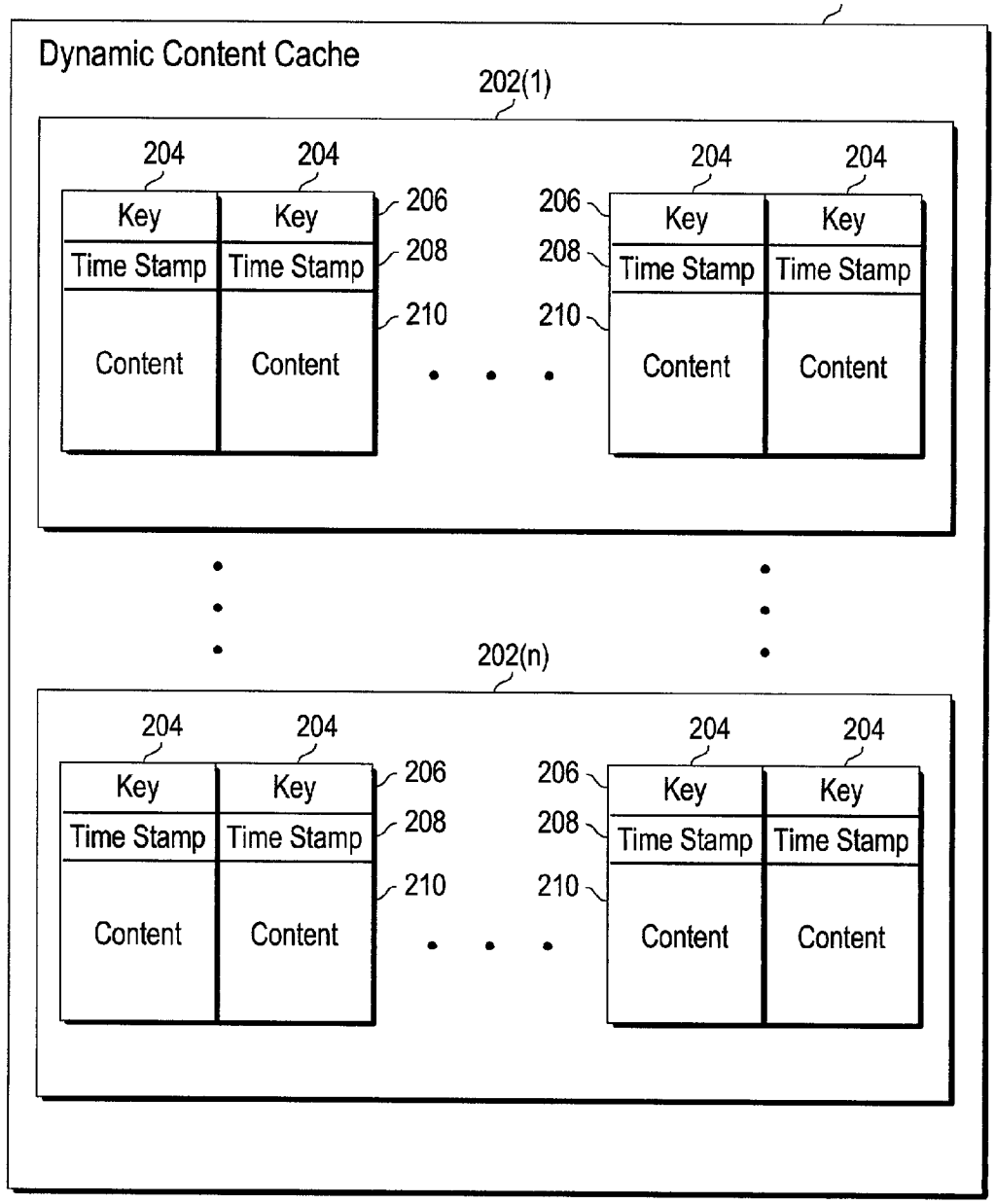
FIG. 2 is a functional diagram of one possible embodiment of the dynamic content cache of FIG. 1.

The dynamic content that is managed by the cache management module 112, and used by the application 108, is stored within the dynamic content cache 116. With reference to FIG. 2, there is shown a functional block diagram of one possible embodiment of the dynamic content cache 116, wherein the cache 116 comprises one or more cache sets 202. As noted previously, each cache set 202 is initialized by the cache management module 112 in response to an init_cache method invocation, and each cache set 202 has a handle and an application 108 associated therewith. In addition, each cache set 202 has a plurality of associated parameters, such as a maximum number of entries (Maxentries), a maximum age for each entry in the cache set (Maxage), and references to several callback functions of the associated application 108. These parameters are established at the time the cache set 202 is initialized (i.e. at the time the init_cache method is invoked).

Each cache set 202 comprises one or more entries 204. In one embodiment, each entry 204 comprises a key portion 206, a timestamp portion 208, and a content portion 210. The key portion 206 stores a key value that uniquely identifies the entry 204 within a particular cache set 202. Given a cache set handle and a key value, a particular entry 204 within the entire cache 116 can be uniquely identified. The timestamp portion 208 stores the time at which a particular entry 204 was last refreshed. In one embodiment, the timestamp and the maximum age value (Maxage) of the cache set 202 are used by the cache management module 112 to determine whether a particular entry 204 is still valid. The content portion 210, in one embodiment, stores a reference or pointer to a set of dynamic content that is associated with the entry. This content is stored in a location in memory, and is generated and refreshed by the application 108 associated with the cache set 202. In addition to a pointer to the memory location, the content portion 210 also stores the size of the dynamic content.

To facilitate access to the entries 204 of the cache 116, the entries 204 in each cache set 202 may be sorted/ordered according to any desired organizational structure. For example, the entries 204 within a cache set 202 may be ordered in the form of a hash table. Alternatively, a b-tree structure may be used to order the entries 204. For purposes of the present invention, any desired organizational structure may be implemented.

Callback Functions

As noted previously, to facilitate interaction between the cache management module 112 (FIG. 1) and the application 108, several callback functions are provided by the application 108. In one embodiment, these callback functions include but are not limited to a Refresh function, a Free function, and a Key Compare function. Since these functions are provided by the application 108, they may implement any logic desired by the developer of the application 108. The implementations for these functions may and often will differ from application to application 108. This ability to allow the applications 108 to provide their own implementations for the callback functions is one of the advantages of system 100. In this section, only an overview of the callback functions will be provided. The specific operations performed by each function will be described in greater detail when the operation of the system 100 is described.

In one embodiment, the Refresh function is invoked by the cache management module 112 when it determines that the dynamic content in a particular cache entry 204 is to be freshly generated. In response to the Refresh function invocation, the application 108 determines what content is to be generated to refresh that entry. Thereafter, the application 108 executes a particular set of logic to dynamically generate a new set of content for that entry. Once generated, the new content is stored into a location in memory, and a reference to the memory location is provided back to the cache management module 112. In addition, the size of the new content is provided to the cache management module 112. In turn, the cache management module 112 stores the reference to the memory location and the size of the new content into the content portion of the particular cache entry. In effect, the Refresh callback function provides the cache management module 112 with a convenient mechanism for updating the contents of a particular cache entry.

The Free callback function is invoked by the cache management module 112 to clear or free the contents of a particular cache entry. Freeing the contents of an entry prepares the entry for accepting a new set of contents. In one embodiment, the cache management module 112 invokes the Free function prior to the Refresh function to prepare an entry to accept a reference to an updated set of contents. In such an embodiment, the process of updating a cache entry involves the invocation of both the Free and the Refresh callback functions.

The Key Compare callback function is invoked by the cache management module 112 to find and access a particular cache entry. As noted previously, the entries 204 (FIG. 2) in each of the cache sets 202 may be ordered in accordance with any desired organizational structure, such as a hash table or a b-tree. These organizational structures typically associate a key or a unique identifier with each element of the structure. In one embodiment, it is the cache management module 112 that implements the organizational structure. Even so, it can be difficult for the cache management module 112 to interpret the keys 206 that are used to identify the entries 204 in a cache set 202. To relieve the cache management module 112 of the key interpretation burden, the application 108 provides the Key Compare function. In one embodiment, when the cache management module 112 needs to determine whether a key with which it has been provided matches the key of one of the entries 204, it invokes the Key Compare callback function. This function will inform the cache management module 112 whether there was a key match. The cache management module 112 continues to traverse the cache set and invoke the Key Compare function until a key match is found or it is determined that there are no more entries in the cache set. By relieving the cache management module 112 of the burden of interpreting keys, the Key Compare callback function maximizes the flexibility of the system 100.

Operation

Figure 3:
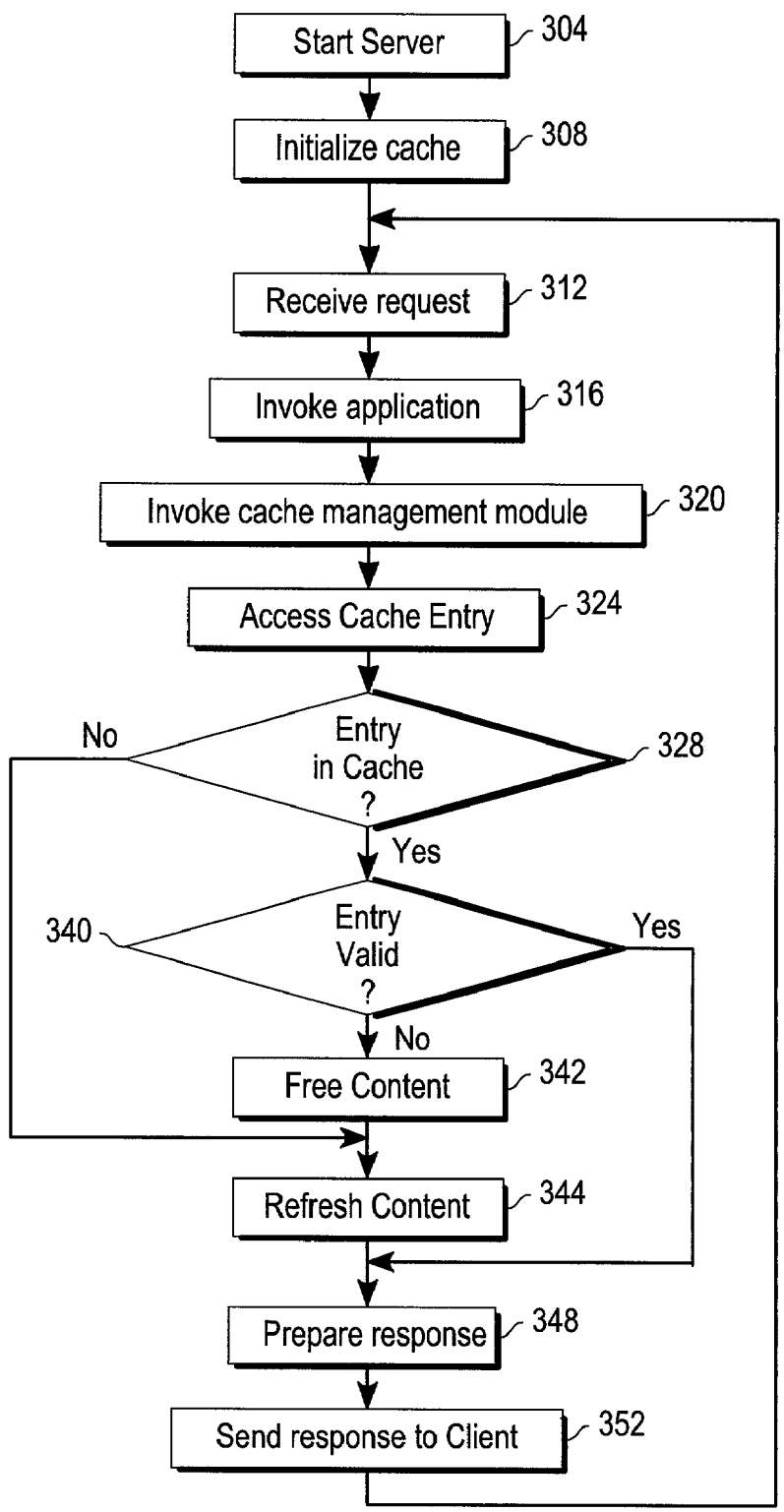
FIG. 3 is an operational flow diagram illustrating a sample operation of the system of FIG. 1.

With reference to the operation flow diagram of FIG. 3, and the diagrams of FIGS. 1 and 2, a sample operation of the system 100 will now be described in detail. Initially, the server 106 is started (304). During startup, the various components 110, 112, 114, 116 (FIG. 1) of the server 106 are instantiated. In addition, each of the applications 108 is instantiated. In the case where the application 108 is a plug-in, the application 108 is integrated into the server 106 and runs in the server's address space. During instantiation, the constructor of the application 108 determines whether it wishes to implement caching of dynamic content. If so, then it invokes the init_cache method of the API 114 to initialize (308) one or more cache sets. Each application 108 may initialize its own cache sets.

In invoking the init_cache method, the application 108 provides several sets of information. This information includes a Maxentries parameter which specifies the maximum number of entries in the cache set, and a Maxage parameter which specifies the maximum time period during which each entry in the cache set remains valid. In addition, the application 108 provides references to a Refresh callback function, a Free callback function, and a Key Compare callback function, all of which are implemented by the application 108. In response to the init_cache method invocation, the cache management module 112 creates a cache set 202 (FIG. 2) in the dynamic content cache 116 and returns a handle to the cache set 202 back to the application 108. In addition, the cache management module 112 associates the parameters passed by the application 108 with the cache set 202, and stores the parameters away for future use. The cache set 202 is thus initialized. In one embodiment, this process is carried out by each application 108 for each cache set 202.

After the cache sets 202 are initialized, the server 106 is ready for regular operation. In the course of operation, the request processing module 110 of the server 106 receives (312) a request from a client 102. For the sake of example, it will be assumed that the request is a request for dynamic content, and that it is directed to application 108. Thus, the request processing module 110 invokes (316) the application 108 to process the request.

In response, the application 108 determines, based upon the request, what actions are to be taken to service the request. For the sake of example, it will be assumed that the request is asking, at least partially, for dynamic content that does not change with every request; thus, the request may be serviced using cached dynamic content. To service the request, the application 108 determines what dynamic content is being requested. For example, is the request asking for a top ten movies list, a best sellers books list, a top performing mutual funds list, etc.? Based upon the request, the application 108 determines a cache set and a key that may be used to access the requested dynamic content from the dynamic content cache 116. Once the cache set is determined, the application 108 retrieves the handle for the cache set that was previously provided by the cache management module 112 in response to the init_cache method invocation. Given the handle and the key, the application 108 can specify which entry in the dynamic content cache 116 is to be accessed to service the request.

In addition to asking for dynamic content that does not change with every request, the request may also ask for additional content. This additional content may include static content and/or dynamic content that changes with every request. For example, the request may ask for a different advertisement or banner to be freshly generated every time. If additional static content is requested, then the application 108 retrieves the static content from a storage (not shown). If additional dynamic content is requested, then the application 108 executes a set of logic to dynamically generate the requested content.

After the handle and key are determined, and the additional content (if any) is retrieved/generated, the application 108 invokes (320) the transmit_cached_response method of the API 114 to cause the cache management module 112 to construct a response to send to the client 102. As part of invoking the transmit_cached_response method, the application 108 provides to the cache management module 112: (1) the handle to the cache set; (2) the key of the particular entry in the cache set to be accessed; and (3) the additional content retrieved/generated by the application 108.

In response to this method invocation, the cache management module 112 attempts to access (324) the specified entry. To do so, the cache management module 112 uses the handle provided by the application 108 to access a particular cache set 202 (FIG. 2). Then, the cache management module 112 determines which of the entries 204 (if any) in the cache set 202 has a key 204 that matches the key provided by the application 108. In one embodiment, the cache management module 112 makes this determination by invoking the Key Compare callback function of the application 108 (recall that references to the Refresh, Free, and Key Compare callbacks functions of the application 108 were associated with the cache set 202 at the time the cache set 202 was initialized). More specifically, the cache management module 112 selects an entry 204 in the cache set 202 and extracts a key (or a portion thereof) from the key portion 206 of the entry 204. The cache management module 112 then invokes the Key Compare callback function of the application 108, providing to the callback function the extracted key and the key provided by the application 108. In response, the Key Compare callback function interprets the keys, and returns a response to the cache management module 112 indicating whether the two keys matched. If not, then the cache management module 112 selects another entry 204 in the cache set 202, extracts a key therefrom, and invokes the Key Compare callback function again. In one embodiment, this process continues until either a key match is found, in which case the proper entry 204 has been found, or it is determined that there is no entry 204 currently in the cache set 202 with the specified key.

If the cache management module 112 determines (328) that no entry 204 in the cache set 202 has the specified key, then it means that this is the first time this key is being used. In such a case, the cache management module 112 knows to create and to populate a new entry 204. To do so, the cache management module 112 invokes (344) the Refresh callback function of the application 108. More specifically, the cache management module 112: (1) creates a new entry 204 in the cache set 202; (2) stores the specified key into the key portion 206 of the new entry 204; and (3) invokes the Refresh callback function, providing to the function the specified key.

In response to the Refresh function invocation, the application 108 determines, based upon the specified key, what content should be in the new entry. Then, the application 108 executes the appropriate set of logic to dynamically generate the content for the new entry. Once the dynamic content is generated, it is stored into a location in memory, and a reference or pointer to the memory location is returned by the application 108 to the cache management module 112. In addition, the application 108 provides the size of the content to the cache management module 112. In turn, the cache management module 112: (1) stores a timestamp (which in one embodiment is the time at which the content was most recently dynamically generated) into the timestamp portion 208 of the new entry 104; and (2) stores the reference to the memory location in which the new content is stored, and the size of the new content, into the content portion 210. The new entry 204 is thus created.

After the new entry 204 is created, the cache management module 112 proceeds to construct (348) a response. In constructing the response, the cache management module 112: (1) extracts the dynamic content from the memory location referenced in the content portion 210 of the new entry 204; and (2) merges the dynamic content with any additional content provided by the application 108 when it invoked the trasmit_cached_response method of the API 114. Once constructed, the response is sent (352) to the client 102 as a response to its request. At that point, the request is fully serviced; hence, the server 106 loops back to (312) to receive another request.

Returning to (328), if the cache management module 112 determines that an entry 204 having the key specified by the application 108 already exists in the cache set 202, then the cache management module 112 proceeds to determine (340) whether the dynamic content 210 referenced in that entry is still valid. In one embodiment, the cache management module 112 makes this determination by: (1) comparing the timestamp 208 of the entry 204 with a current time value; and (2) determining whether the difference between these values is greater than the Maxage parameter associated with the cache set 202. If so, then it means that the entry 204 is older than the maximum age allowed for entries in that cache set 202, thereby meaning that the dynamic content associated with the entry 204 is no longer valid. In such a case, the cache management module 112 proceeds to refresh the dynamic content.

In one embodiment, the cache management module 112 refreshes the dynamic content of an entry 204 by first invoking (342) the Free callback function of the application 108. In invoking the Free function, the cache management module 112: (1) extracts the memory location reference and the size of the content from the content portion 210 of the entry; (2) disassociates this information from the content portion 210; and (3) invokes the Free callback function, providing to the function the memory location reference and the size of the dynamic content. In response to the invocation, the Free callback function frees or releases the memory space occupied by the current (and no longer valid) dynamic content. By doing so, the Free function makes the memory space available for use for other purposes. Once the Free function has performed its function, the cache management module 112 invokes (344) the Refresh callback function to refresh the dynamic content of the entry 204. In doing so, the cache management module 112 provides the specified key to the Refresh function.

In response to the Refresh function invocation, the application 108 determines, based upon the specified key, what content belongs in the entry 204. Then, the application 108 executes the appropriate set of logic to dynamically generate the content for the entry 204. Once the dynamic content is generated, it is stored into a location in memory, and a reference or pointer to the memory location is returned by the application 108 to the cache management module 112. In addition, the application 108 provides the size of the content to the cache management module 112. In turn, the cache management module 112: (1) stores a timestamp (which in one embodiment is the time at which the content was most recently dynamically generated) into the timestamp portion 208 of the entry 204; and (2) stores the reference to the memory location in which the new content is stored, and the size of the new content, into the content portion 210. The entry 204 is thus refreshed.

After the entry 204 is refreshed, the cache management module 112 proceeds to construct (348) a response. In constructing the response, the cache management module 112: (1) extracts the dynamic content 210 from the memory location referenced in the content portion 210 of the entry 204; and (2) merges the dynamic content with any additional content provided by the application 108 when it invoked the trasmit_cached_response method of the API 114. Once constructed, the response is sent (352) to the client 102 as a response to its request. At that point, the request is fully serviced; hence, the server 106 loops back to (312) to receive another request.

Returning to (340), if the cache management module 112 determines that the dynamic content 210 in the entry 204 is not out of date but rather is still valid, then the cache management module 112 does not refresh (i.e. does not dynamically generate) the dynamic content 210. Rather, the cache management module 112 uses the dynamic content 210 already associated with the entry 204 to construct (348) the response. More specifically, the cache management module 112: (1) extracts the dynamic content from the memory location referenced in the content portion 210 of the entry 204; and (2) merges the dynamic content with any additional content provided by the application 108 when it invoked the trasmit_cached_response method of the API 114. Once constructed, the response is sent (352) to the client 102 as a response to its request. At that point, the request is fully serviced; hence, the server 106 loops back to (312) to receive another request.

Thus far, the invention has been described assuming that the actual cached dynamic content is stored in memory. While this is one possible implementation, it should be noted that, for purposes of the present invention, the cached content may be stored on any type of storage, including but not limited to persistent mass storage such as a disk drive. In fact, the invention may be implemented using a combination of different storage types. For example, some of the cached dynamic content may be stored in memory while others are stored as files on disk.

To accommodate an implementation in which the cached dynamic content is stored in storage other than memory, an additional set of information may be stored in the content portion 210 of each cache entry 204. This additional information is an indication of the storage type. Together with the reference and size information already stored in the content portion 210, the storage type information enables a set of cached dynamic content to be easily accessed.

Depending upon the storage type, the reference information that is stored in the content portion 210 of an entry 204 may differ. For example, if the storage type is disk, then the reference information may be the name of the file in which the dynamic content is stored on the disk. If the storage type is memory, then the reference information may be a pointer to a particular location in memory. Regardless of the storage type, if the type of storage is specified, a reference to a particular location or entity on the storage is provided, and a size is given, the dynamic content stored on the storage can be accessed.

In such an implementation, additional information is passed between the application 108 and the cache management module 112 during method/function invocation. More specifically, when the cache management module 112 invokes the Free callback function, the cache management module 112 provides to the function: (1) the storage type; (2) a reference to a location or entity on the storage; and (3) a size. This information is extracted by the cache management module 112 from the content portion 210 of the entry 204 that is being freed. Given this information, the Free function can perform all of the necessary actions (e.g. delete a file or free a chunk of memory) to free the dynamic content from the storage.

Also, when the application 108 returns to the cache management module 112 after a Refresh function invocation, the application 108 provides to the cache management module 112: (1) the storage type; (2) a reference to a location or entity on the storage in which the freshly generated dynamic content is stored; and (3) the size of the content. In turn, the cache management module 112 stores all of this information into the content portion 210 of the entry 204 associated with the dynamic content. That way, when the cache management module 112 wishes to access the dynamic content in response to a transmit_cached_response method invocation, it has all of the information that it needs to access the dynamic content. With the additional storage type information, this implementation involves a slight amount of overhead, but by making it possible to store the dynamic content on any storage, it greatly enhances the versatility of the server 106.

In the manner described, the server 106 and the application 108 cooperate to efficiently manage the caching of dynamic content. More specifically, dynamic content is cached and reused when possible to respond to requests, thereby saving processing resources and improving system performance. When needed, though, content may also be dynamically generated to refresh potentially stale cached content. By generating dynamic content on an as needed basis rather than on a constant basis, the present invention provides the best of both worlds. On the one hand, it allows the flexibility and versatility of dynamic content to be realized. On the other hand, it realizes this benefit without degrading system performance. As a result, the present invention represents a significant improvement over the prior art.

Hardware Overview

Figure 4:
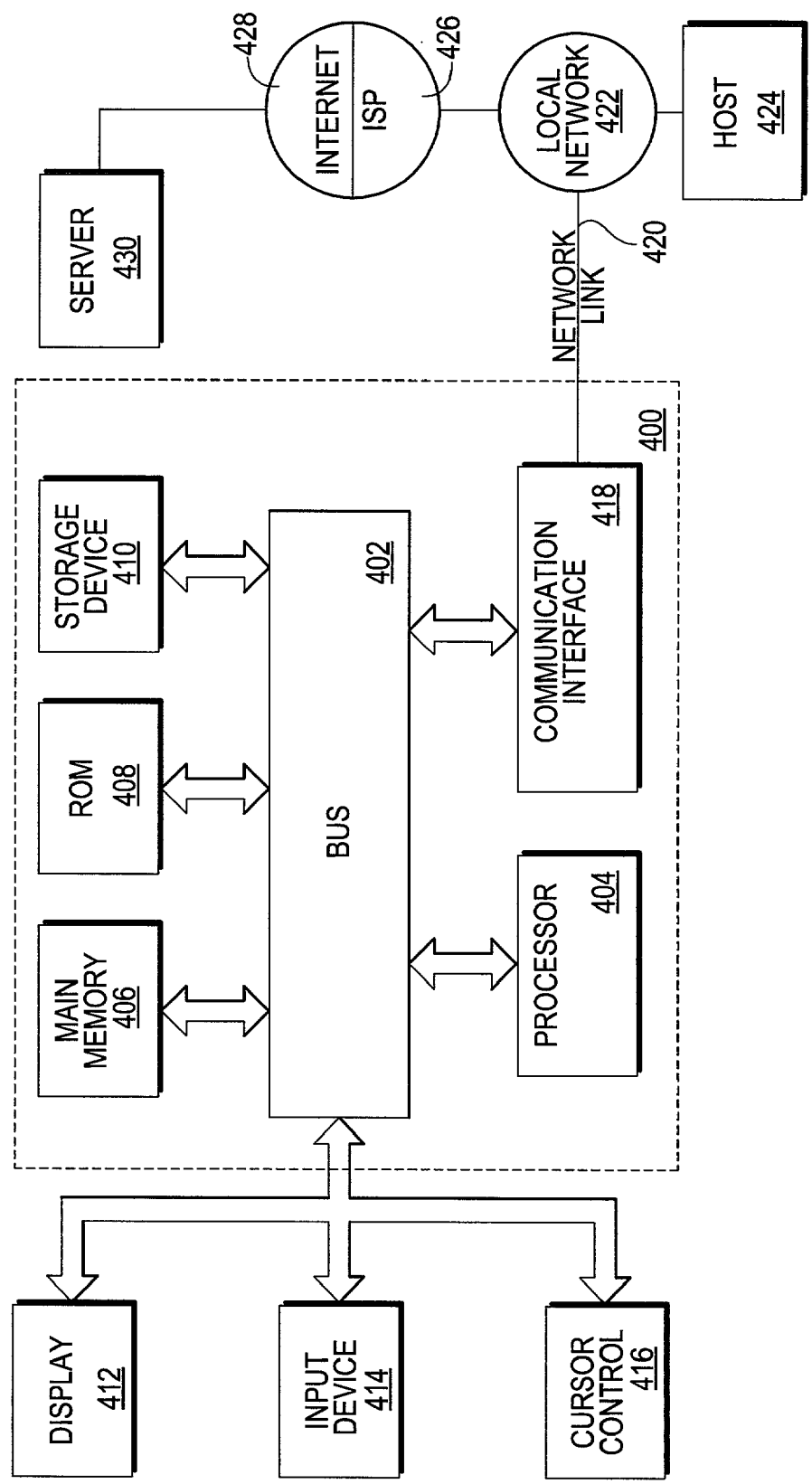
FIG. 4 is a hardware block diagram of a computer system in which one embodiment of the present invention may be implemented.

In one embodiment, the server 106 of the present invention and its various components are implemented as a set of instructions executable by one or more processors. The invention may be implemented as part of an object oriented programming system, including but not limited to the JAVA™ programming system manufactured by Sun Microsystems, Inc. of Palo Alto, Calif. FIG. 4 shows a hardware block diagram of a computer system 400 in which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 may also be further used to store temporary variables or other intermediate information during execution of instructions by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

According to one embodiment, the functionality of the present invention is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer-implemented method for serving dynamic content, comprising:

receiving an initialization instruction from an application to initialize a cache set in a cache, said initialization instruction including one or more references to one or more functions of said application that may be invoked to maintain said cache set;

initializing said cache set;

associating with said cache set said one or more references;

receiving an instruction from said application to send a cached version of dynamic content to a client to respond to a request from said client, wherein said dynamic content is stored in an unassembled form prior to being requested by any party;

accessing information associated with said cached version of said dynamic content from said cache;

determining whether said cached version of said dynamic content is currently valid;

in response to a determination that said cached version of said dynamic content is not currently valid:
  instructing said application to dynamically generate said dynamic content to derive an updated version of said dynamic content;
  incorporating said updated version of said dynamic content into a response to said request; and
  sending said response to said client.

2. The method of claim 1, further comprising:
replacing said cached version of said dynamic content with said updated version of said dynamic content in said cache.

3. The method of claim 1, wherein said instruction includes a specified key to a particular entry in said cache which contains information associated with said cached version of said dynamic content, and wherein accessing said information associated with said cached version of said dynamic content from said cache comprises:
  extracting a candidate key from an entry in said cache; and
  invoking a comparison function of said application to cause said application to compare said specified key with said candidate key to determine whether there is a match.

4. The method of claim 1, wherein instructing said application to dynamically generate said dynamic content comprises:
  invoking a refresh function of said application to cause said application to dynamically generate said dynamic content.

5. The method of claim 4, wherein said refresh function is a callback function.

6. The method of claim 4, further comprising:
  prior to invoking said refresh function, invoking a free function of said application to cause said application to clear said cached version of said dynamic content.

7. The method of claim 6, wherein said free function is a callback function.

8. The method of claim 1, further comprising:
in response to a determination that said cached version of said dynamic content is currently valid:
  incorporating said cached version of said dynamic content into said response rather than instructing said application to dynamically generating said dynamic content; and
  sending said response to said client.

9. The method of claim 8, further comprising:
receiving a set of additional content from said application; and
in response to a determination that said cached version of said dynamic content is not currently valid, incorporating said additional content into said response along with said updated version of said dynamic content.

10. The method of claim 9, wherein said additional content is dynamically generated by said application.

11. The method of claim 8, further comprising:
receiving a set of additional content from said application; and
in response to a determination that said cached version of said dynamic content is currently valid, incorporating said additional content into said response along with said cached version of said dynamic content.

12. The method of claim 8, wherein said additional content is dynamically generated by said application.

13. A computer-implemented method for servicing a request, comprising:

receiving an initialization instruction from an application to initialize a cache set in a cache, said initialization instruction including one or more references to one or more functions of said application that may be invoked to maintain said cache set;
initializing said cache set;
associating with said cache set said one or more references;
receiving a first request for a set of dynamic content;
dynamically generating said dynamic content, wherein said dynamic content is stored in an unassembled form prior to being requested by any party;
storing a cached version of said dynamic content in said cache;
receiving, from a client, a request for said dynamic content;
accessing information associated with said cached version of said dynamic content;
determining whether said cached version of said dynamic content is cuffently valid;
in response to a determination that said cached version of said dynamic content is not currently valid:
  dynamically generating said dynamic content to derive an updated version of said dynamic content;
  incorporating said updated version of said dynamic content into a response to said second request;
  sending said response to said client;
in response to a determination that said cached version of said dynamic content is currently valid:
  incorporating said cached version of said dynamic content into said response rather than dynamically generating said dynamic content; and
  sending said response to said client.

14. The method of claim 13, further comprising:
replacing said cached version of said dynamic content with said updated version of said dynamic content in said cache.

15. The method of claim 13, wherein said dynamic content is dynamically generated only if said cached version of said dynamic content is not currently valid.

16. The method of claim 13, wherein said request calls for additional content in addition to said dynamic content, and wherein said method further comprises:
  dynamically generating said additional content; and
  in response to a determination that said cached version of said dynamic content is currently valid, incorporating said additional content into said response along with said cached version of said dynamic content.

17. The method of claim 13, wherein said request calls for additional content in addition to said dynamic content, and wherein said method further comprises:
  dynamically generating said additional content; and
  in response to a determination that said cached version of said dynamic content is not currently valid, incorporating said additional content into said response along with said updated version of said dynamic content.

18. A computer readable storage medium having stored thereon instructions which, when executed by one or more processors, cause the one or more processors to service a request, said computer readable medium comprising:
  instructions for causing one or more processors to receive an initialization instruction from said application to initialize a cache set in said cache, said initialization instruction including one or more references to one or more functions of said application that may be invoked to maintain said cache set;

instructions for causing one or more processors to initialize said cache set;
instructions for causing one or more processors to associate with said cache set said one or more references;
instructions for receiving a first request for a set of dynamic content;
instructions for dynamically generating said dynamic content, wherein said dynamic content is stored in an unassembled form prior to being requested by any party;
instructions for storing a cached version of said dynamic content in said cache;
instructions for causing one or more processors to receive, from a client, a second request for said dynamic content;
instructions for causing one or more processors to access information associated with said cached version of said dynamic content;
instructions for causing one or more processors to determine whether said cached version of said dynamic content is currently valid;
instructions for causing one or more processors to dynamically generate said dynamic content to derive an updated version of said dynamic content in response to determining that said cached version of said dynamic content is not currently valid;
instructions for causing one or more processors to incorporate said updated version of said dynamic content into a response to said second request in response to determining that said cached version of said dynamic content is not currently valid;
instructions for causing one or more processors to send said response to said client in response to determining that said cached version of said dynamic content is not currently valid;
instructions for incorporating said cached version of said dynamic content into said response rather than dynamically generating said dynamic content in response to a determination that said cached version of said dynamic content is currently valid; and
instructions for sending said response to said client in response to said determination that said cached version of said dynamic content is currently valid.

19. The computer readable storage medium of claim 18, further comprising:
instructions for causing one or more processors to replace said cached version of said dynamic content with said updated version of said dynamic content in said cache.

20. The computer readable storage medium of claim 18, wherein said dynamic content is dynamically generated only if said cached version of said dynamic content is not currently valid.

21. The computer readable storage medium of claim 18, wherein said request calls for additional content in addition to said dynamic content, and wherein said computer readable medium further comprises:
instructions for causing one or more processors to dynamically generate said additional content; and
instructions for causing one or more processors to incorporate, in response to a determination that said cached version of said dynamic content is currently valid, said additional content into said response along with said cached version of said dynamic content.

22. The computer readable storage medium of claim 18, wherein said request calls for additional content in addition to said dynamic content, and wherein said computer readable medium further comprises:
instructions for causing one or more processors to dynamically generate said additional content; and
instructions for causing one or more processors to incorporate, in response to a determination that said cached version of said dynamic content is not currently valid, said additional content into said response along with said updated version of said dynamic content.

23. A computer readable storage medium having stored thereon instructions which, when executed by one or more processors, cause the one or more processors to serve dynamic content, said computer readable medium comprising:
instructions for causing one or more processors to receive an initialization instruction from said application to initialize a cache set in said cache, said initialization instruction including one or more references to one or more functions of said application that may be invoked to maintain said cache set;
instructions for causing one or more processors to initialize said cache set; and
instructions for causing one or more processors to associate with said cache set said one or more references
instructions for causing one or more processors to receive an instruction from said application to send a cached version of dynamic content to said client to respond to a request from said client, wherein said dynamic content is stored in an unassembled form prior to being requested by any party;
instructions for causing one or more processors to access information associated with said cached version of said dynamic content from a cache;
instructions for causing one or more processors to determine whether said cached version of said dynamic content is currently valid;
in response to a determination that said cached version of said dynamic content is not currently valid:
instructions for causing one or more processors to instruct said application to dynamically generate said dynamic content to derive an updated version of said dynamic content;
instructions for causing one or more processors to incorporate said updated version of said dynamic content into a response to said request; and
instructions for causing one or more processors to send said response to said client.

24. The computer readable storage medium of claim 23, further comprising:
instructions for causing one or more processors to replace said cached version of said dynamic content with said updated version of said dynamic content in said cache.

25. The computer readable storage medium of claim 23, wherein said instruction from said application includes a specified key to a particular entry in said cache which contains information associated with said cached version of said dynamic content, and wherein said instructions for causing one or more processors to access said information associated with said cached version of said dynamic content from said cache comprises:
instructions for causing one or more processors to extract a candidate key from an entry in said cache; and
instructions for causing one or more processors to invoke a comparison function of said application to cause said application to compare said specified key with said candidate key to determine whether there is a match.

26. The computer readable storage medium of claim 23, wherein said instructions for causing one or more processors to instruct said application to dynamically generate said dynamic content comprises:
   instructions for causing one or more processors to invoke a refresh function of said application to cause said application to dynamically generate said dynamic content.

27. The computer readable storage medium of claim 26, wherein said refresh function is a callback function.

28. The computer readable storage medium of claim 26, further comprising:
   instructions for causing one or more processors to invoke, prior to invoking said refresh function, a free function of said application to cause said application to clear said cached version of said dynamic content.

29. The computer readable storage medium of claim 28, wherein said free function is a callback function.

30. The computer readable storage medium of claim 23, further comprising:
   in response to a determination that said cached version of said dynamic content is currently valid:
   instructions for causing one or more processors to incorporate said cached version of said dynamic content into said response rather than instructing said application to dynamically generating said dynamic content; and
   instructions for causing one or more processors to send said response to said client.

31. The computer readable storage medium of claim 30, further comprising:
   instructions for causing one or more processors to receive a set of additional content from said application; and
   instructions for causing one or more processors to incorporate, in response to a determination that said cached version of said dynamic content is not currently valid, said additional content into said response along with said updated version of said dynamic content.

32. The computer readable storage medium of claim 31, wherein said additional content is dynamically generated by said application.

33. The computer readable storage medium of claim 30, further comprising:
   instructions for causing one or more processors to receive a set of additional content from said application; and
   instructions for causing one or more processors to incorporate, in response to a determination that said cached version of said dynamic content is currently valid, said additional content into said response along with said cached version of said dynamic content.

34. The computer readable storage medium of claim 30, wherein said additional content is dynamically generated by said application.

* * * * *

UNITED STATES PATENT AND TRADEMARK OFFICE
CERTIFICATE OF CORRECTION

PATENT NO.       : 7,320,023 B2
APPLICATION NO.  : 09/792811
DATED            : January 15, 2008
INVENTOR(S)      : Murthy Chintalapati et al.

It is certified that error appears in the above-identified patent and that said Letters Patent is hereby corrected as shown below:

Col. 16, Claim 13, line 20, replace "cuffently" with --currently--

Signed and Sealed this

Seventeenth Day of June, 2008

JON W. DUDAS
*Director of the United States Patent and Trademark Office*